US012558627B2

(12) United States Patent
Otomo

(10) Patent No.: US 12,558,627 B2
(45) Date of Patent: Feb. 24, 2026

(54) RECORDING MEDIUM AND INFORMATION PROCESSING DEVICE

(71) Applicant: SEGA CORPORATION, Tokyo (JP)

(72) Inventor: Takahiro Otomo, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 330 days.

(21) Appl. No.: 18/329,761

(22) Filed: Jun. 6, 2023

(65) Prior Publication Data

US 2023/0311004 A1 Oct. 5, 2023

Related U.S. Application Data

(63) Continuation of application No. PCT/JP2021/039738, filed on Oct. 28, 2021.

(30) Foreign Application Priority Data

Jan. 7, 2021 (JP) ................................. 2021-001404

(51) Int. Cl.
*A63F 13/00* (2014.01)
*A63F 13/533* (2014.01)
*A63F 13/69* (2014.01)
*A63F 13/822* (2014.01)
(52) U.S. Cl.
CPC ............. *A63F 13/69* (2014.09); *A63F 13/533* (2014.09); *A63F 13/822* (2014.09)
(58) Field of Classification Search
CPC ........ A63F 13/45; A63F 13/795; A63F 13/79; A63F 13/77; A63F 13/58
See application file for complete search history.

(56) References Cited

FOREIGN PATENT DOCUMENTS

| | | | | | | |
|---|---|---|---|---|---|---|
| JP | 2002174335 | A | * | 6/2002 | ......... | F16H 61/0437 |
| JP | 2018-140288 | A | | 9/2018 | | |
| JP | 6389345 | B2 | | 9/2018 | | |
| JP | 2022113857 | A | * | 8/2022 | | |

OTHER PUBLICATIONS

"Detailed Commentary on Evolution and Awakening! How to Get Materials! Kingdom of Heroes Strategy wiki" URL: https://gameappch. com/kinhero/archive/?num=6 (10 pages).
"October 2015 Additional Update Information (UI Improvements)", URL: https://kohofficial.com/archives/1839 (5 pages).
International Search Report issued in corresponding International Application No. PCT/JP2021/039738 mailed Dec. 7, 2021 (6 pages).
Written Opinion issued in corresponding International Application No. PCT/JP2021/039738 mailed Dec. 7, 2021 (4 pages).

* cited by examiner

*Primary Examiner* — David L Lewis
*Assistant Examiner* — Eric M Thomas
(74) *Attorney, Agent, or Firm* — Osha Bergman Watanabe & Burton LLP

(57) ABSTRACT

A non-transitory computer readable recording medium storing instructions that cause a computer to function as: extracts, from among player's possessed contents, a content group to which an evolved content as a new evolution destination has been added via a game update, causes a display device to display a notification screen that notifies the extracted content group, receives, via an input device, a batch instruction to collectively evolve each of contents included in the content group after the notification screen has been displayed, and upon receiving the batch instruction, collectively evolves and fuses the contents into the evolved content.

6 Claims, 8 Drawing Sheets

RECORDING MEDIUM AND INFORMATION PROCESSING DEVICE

BACKGROUND

Technical Field

The present invention relates to a recording medium storing instructions and an information processing device.

Description of Related Art

Games in which new content is added via a game update (such as a version upgrade or update) have been known in the past.

In relation to this, Patent Literature 1 discloses a technique in which, when a new evolution destination (evolved content) is added to a player's possessed content via a game update, the player is notified that the new evolution destination has been added.

PATENT LITERATURE

Patent Literature 1: Japanese Patent No. 6,389,345

However, with the technique described in Patent Literature 1, when there is a notification that a new evolution destination has been added to a plurality of possessed contents, the player had to perform an operation to evolve each of the plurality of possessed contents for which there was a notification, and this was a problem in that the operation took time and effort.

SUMMARY

One or more embodiments of the present invention provide a technological improvement over such conventional technologies as discussed above. In particular, one or more embodiments of the present invention provide a recording medium storing instructions and an information processing device that realize improved displaying/input functions of a display device and/or an input device. This enables, for example, evolving, by a simple operation, from among player's possessed contents, a plurality of contents to which new evolution destinations have been added via a game update.

According to a first aspect of the present invention, there is provided a non-transitory computer readable recording medium storing instructions that cause a computer to function as: a control device that: extracts, from among player's possessed contents, a content group to which an evolved content, which is a new evolution destination, has been added via a game update, causes a display device to display a notification screen that notifies the extracted content group, receives, via an input device, a batch instruction to collectively evolve each of contents included in the content group after the notification screen has been displayed, and upon receiving the batch instruction, collectively evolves and fuses the contents into the evolved content.

Also, in a second aspect of the present invention, the control device further: receives, via the input device, a selection instruction to select part or all of the contents included in the content group after the notification screen has been displayed but before the batch instruction has been received, and upon receiving the batch instruction, collectively evolves and fuses the selected contents.

Also, in a third aspect of the present invention, the control device further: extracts a cost required to evolve each of the contents included in the content group into the evolved content, and causes the display device to display a cost information area indicating the extracted costs on a screen that receives the selection instruction.

Also, in a fourth aspect of the present invention, the cost includes an evolution resource content.

Also, in a fifth aspect of the present invention, the evolution resource content possessed by a player has a specific parameter that rises in a case that a homologous content is fused, and in a case that the specific parameter is lower than a value required for evolution, the cost information area indicates that the specific parameter is missing.

Also, in a sixth aspect of the present invention, the cost information area includes an instruction button for transitioning to a play screen of a game event in which the evolution resource content that has the missing specific parameter, or the homologous content of the evolution resource content, can be earned.

Also, according to a seventh aspect of the present invention, there is provided an information processing device that comprises: a control device that: extracts, from among player's possessed contents, a content group to which an evolved content, which is a new evolution destination, has been added via a game update, causes a display device to display a notification screen that notifies the extracted content group, receives, via an input device, a batch instruction to collectively evolve each of contents included in the content group after the notification screen has been displayed, and upon receiving the batch instruction, collectively evolves and fuses the contents into the evolved content.

With one or more embodiments of the present invention, from among player's possessed contents, a plurality of contents to which new evolution destinations have been added via a game update can be evolved by a simple operation.

DETAILED DESCRIPTION

Figure 1:
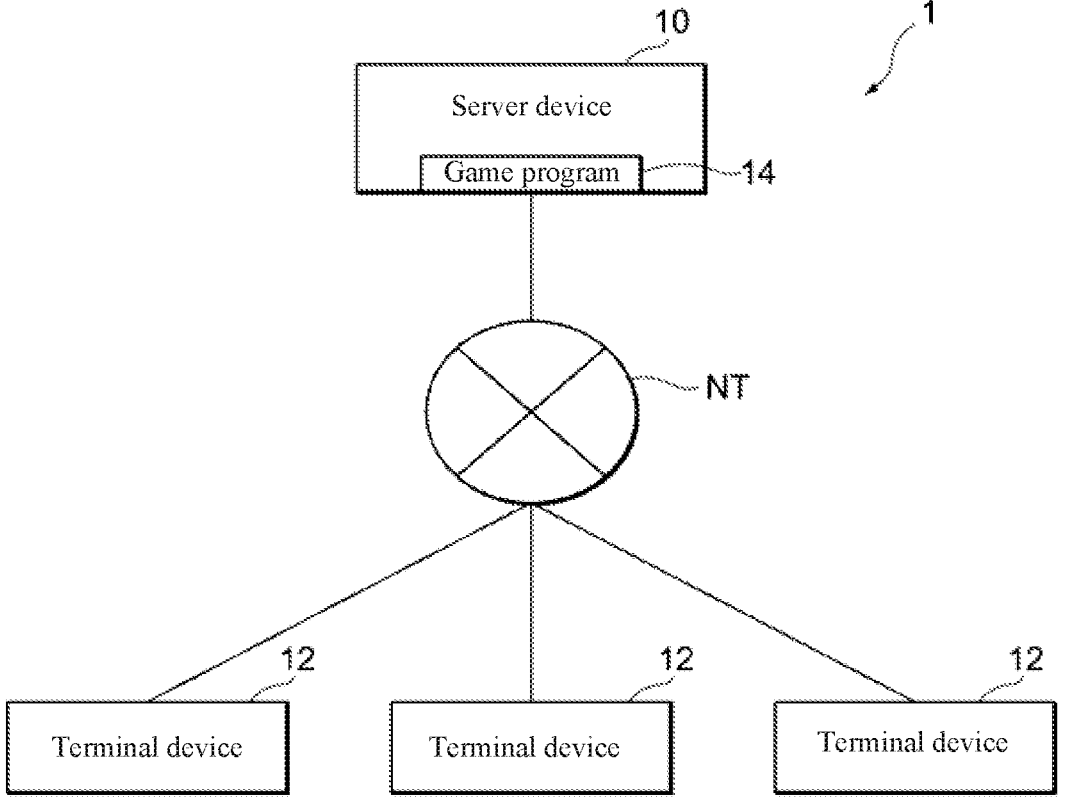
FIG. 1 is a block diagram showing an example of the overall configuration of a game system according to one or more embodiments.

Embodiments " " of the present invention will now be described with reference to the appended drawings.

To facilitate understanding of the description, components and steps that are the same will be numbered the same as much as possible in the drawings, and redundant description will be omitted.

Overall Configuration

FIG. 1 is a block diagram showing an example of the overall configuration of a game system 1 according to one or more embodiments.

As shown in FIG. 1, a game system 1 comprises a server device 10 and one or more terminal devices 12 each comprising an input device such as a keyboard, mouse, controller, and stick. The server device 10 and terminal devices 12 are connected so as to be able to communicate via a communication network NT such as an intranet, the Internet, or a telephone line.

The server device 10 is an information processing device that provides the execution results of the game obtained by executing the game program (i.e., instructions) 14, or the game program 14 itself, to the player of each terminal device 12 via the communication network NT. In one or more embodiments, the server device 10 provides the game program 14 itself to the players of the terminal devices 12.

Each terminal device 12 is an information processing device belonging to a player, and is an information processing device that provides a game to a player by executing the game program 14 received from the server device 10 after the program or the instructions have been installed. Examples of these terminal devices 12 include video game machines, consumer software (CS) device, virtual reality (VR) player, arcade game machines, mobile phones, smartphones, tablets, personal computers (PCs), and various other such devices.

Hardware Configuration

Figure 2:
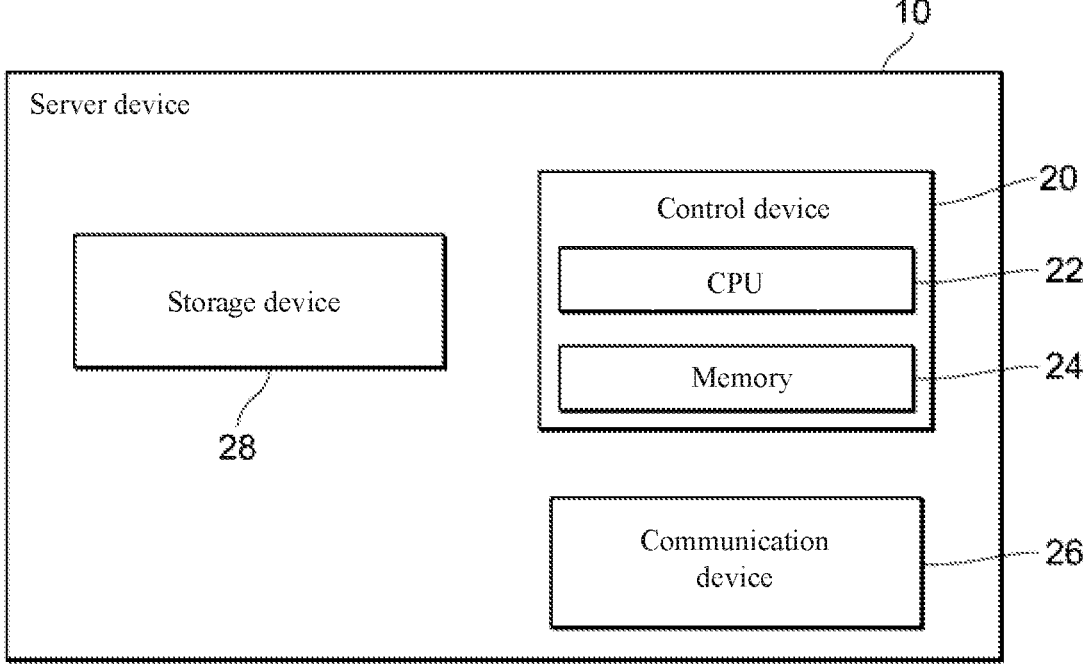
FIG. 2 is a diagram schematically showing an example of the hardware configuration of a server device.

FIG. 2 is a diagram schematically showing an example of the hardware configuration of the server device 10.

As shown in FIG. 2, the server device 10 comprises a control device 20, a communication device 26, and a storage device 28. The control device 20 mainly comprises a CPU (central processing unit) 22 and a memory 24.

In the control device 20, the CPU 22 functions as various functional units by executing specific programs or instructions stored in the memory 24, the storage device 28, or the like. These functional units will be described in detail below.

The communication device 26 is constituted by a communication interface or the like for communicating with an external device. The communication device 26 sends and receives various kinds of information to and from the terminal device 12, for example.

The storage device 28 is constituted by a hard disk or the like. The storage device 28 stores various kinds of programs or instructions and various kinds of information necessary for executing processing in the control device 20, including the game program 14, as well as information about processing results.

The server device 10 can be realized by using an information processing device such as a dedicated or general-purpose server computer. Also, the server device 10 may be constituted by a single information processing device, or may be constituted by a plurality of information processing devices distributed on the communication network NT. Also, FIG. 2 shows only a part of the main hardware configuration of the server device 10, and the server device 10 can comprise other components that are ordinarily provided to a server. Also, the hardware configuration of the plurality of terminal devices 12 may have the same configuration as the server device 10, except for comprising operation means, a display device, and a sound output device, for example.

Figure 3:
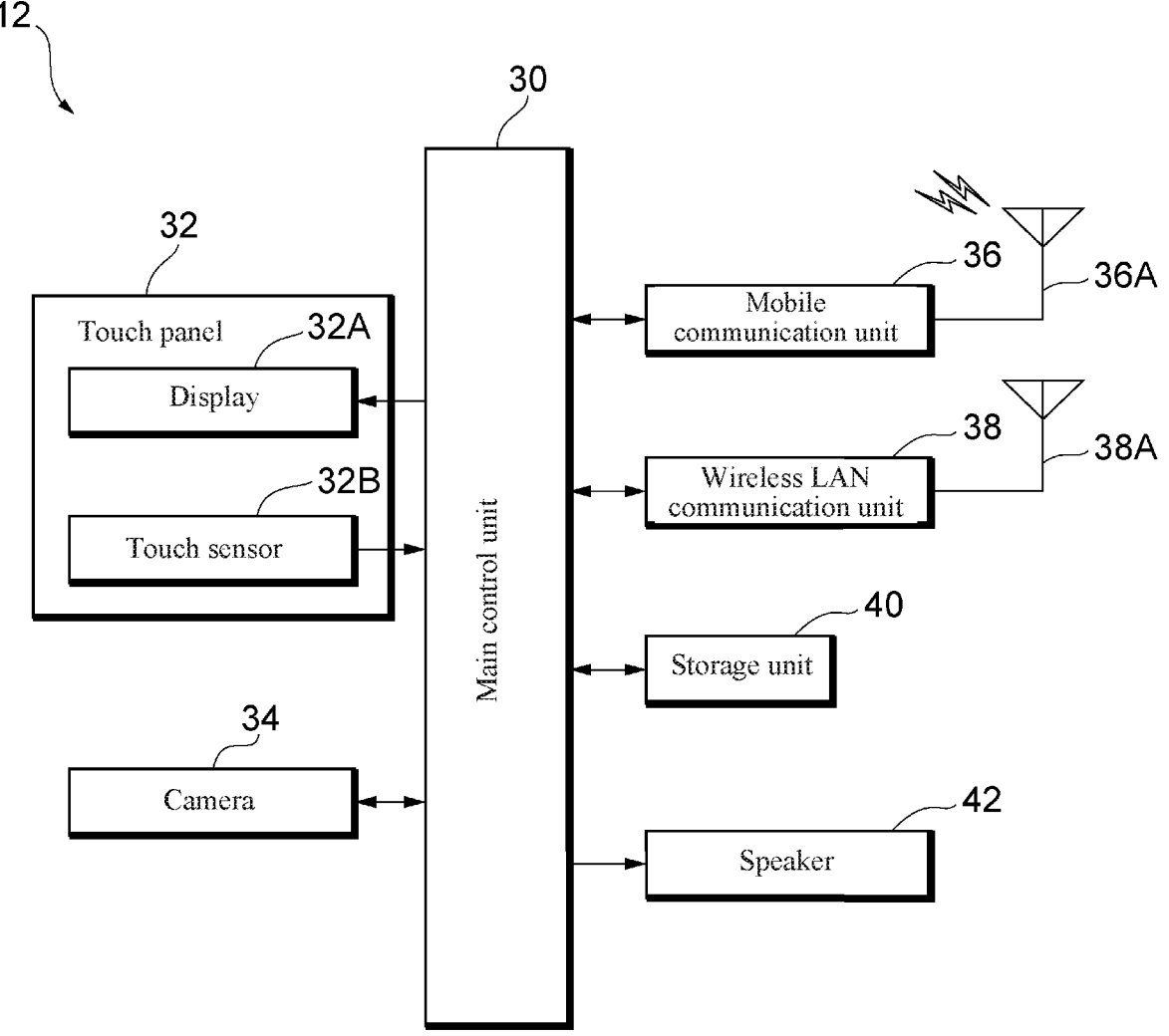
FIG. 3 is a diagram showing an example of the hardware configuration of a smart phone, as the terminal device shown in FIG. 1.

FIG. 3 is a diagram showing an example of the hardware configuration of a smartphone serving as the terminal device 12 shown in FIG. 1.

As shown in FIG. 3, the terminal device 12 comprises a main control unit 30, a touch panel (touch screen) 32, a camera 34, a mobile communication unit 36, a wireless LAN communication unit 38, a storage unit 40, and a speaker 42.

The main control unit 30 includes a CPU, a memory, and the like. This main control unit 30 is connected to the touch panel 32 (used as a display input device), the camera 34, the mobile communication unit 36, the wireless LAN communication unit 38, the storage unit 40, and the speaker 42. The main control unit 30 has the function of controlling these connected devices.

The touch panel 32 has both a display function and an input function, and is constituted by a display 32A that handles the display function, and a touch sensor 32B that handles the input function. In one or more embodiments, the display 32A can display game images including button images, a cross key image, a joystick image, and other such operation input images. The touch sensor 32B can sense the input position of the player with respect to a game image.

The camera 34 has the function of capturing still and/or moving images and storing these images in the storage unit 40.

The mobile communication unit 36 is connected to a mobile communication network via an antenna 36A, and has the function of communicating with other communication devices that are connected to this mobile communication network.

The wireless LAN communication unit 38 is connected to the communication network NT via an antenna 38A, and has the function of communicating with other devices, such as the server device 10, that are connected to the communication network NT.

The storage unit 40 stores various kinds of programs or instructions and data, such as the game program 14, and play data indicating player information or the progress of the game in the game program 14. This play data may be stored in the server device 10.

The speaker 42 has the function of outputting game sounds and so forth.

Game Overview

The game according to one or more embodiments includes game events such as lottery games and quests in which a player can earn characters (an example of content), and rearing games in which the earned characters can be strengthened or evolved. These lottery games are sometimes referred to as gacha (loot box), raffle, summoning, or the like. These quests are sometimes referred to as battle games, dungeons, searches, missions, or the like.

A lottery game according to one or more embodiments is a game in which a player is allowed to earn one or more randomly selected characters from the lottery target character group, in accordance with an instruction (request) from a player to execute a lottery game. This lottery is executed on the basis of consumption of items possessed by the player. Examples of these items include charged items (paid stones, paid tickets, etc.) and non-charged items (free stones, free tickets, etc.). A charged item is a paid item granted to the player on the basis of a payment made with money, prepaid card, credit card, or the like. Also, a non-charged item is a free item given to the player in the game. A non-charged item has the same value as, for example, a charged item.

Also, a quest according to one or more embodiments is a game in which a team composed of one or more characters possessed by a player and enemy characters play against each other on the basis of an instruction (request) from the player to execute the quest. These quests are executed on the basis of the consumption of the current stamina associated with the player. The player can acquire a clearance reward by clearing a quest. Examples of clearance rewards include non-charged items (free stones, free tickets, etc.), coins, enemy characters (evolution resource characters) that appear in quests, player experience points for raising the player rank, and so on.

A rearing game according to one or more embodiments is a game in which a resource character (resource content) is fused with a base character (base content). In a rearing game according to one or more embodiments, strengthening fusion is performed, as a first character fusion, in which the ability parameters of the base character are changed by consuming a certain number of coins and a resource character arbitrarily selected by the player. In this first character fusion, if the base character and the resource character are homologous characters, strengthening fusion is performed in which at least a specific parameter of the base character is changed (increased). These specific parameters may include, for example, luck, skill level, awakening level, or the like. On the other hand, in the first character fusion, if the base character and the resource character are not homologous characters, strengthening fusion is performed in which at least a level of the base character is changed (increased), but a specific parameter is not changed (increased). Homologous characters refer to characters having the same character ID as another character, or characters representing different stages of evolution (evolution series). For example, a character K and a character N obtained by evolving the character K three times are homologous characters. An evolution resource character (evolution resource content; discussed below) can be a base character or a resource character in the first character fusion. That is, the evolution resource character has a specific parameter that changes (increases) in a case that the homologous characters are fused.

For example, if the player arbitrarily selects a base character and a resource character from his possessed characters in the strengthening fusion menu in a rearing game, the player can perform strengthening fusion on the condition that the player possesses a specific number of coins.

Also, with the rearing game according to one or more embodiments, evolution fusion is performed, as a second character fusion, in which a base character is evolved into an evolved character (an evolved content), which is a different character, by consuming a cost associated with that base character in advance.

For example, when the player arbitrarily selects a base character from his possessed characters in an evolution fusion menu in the rearing game, the player can perform evolution fusion on the condition that the player possesses the cost corresponding to the base character (evolution resource characters, coins, etc.) in advance.

Also, with the game according to one or more embodiments, new characters (content) are added via a game update. This game update is sometimes called a version upgrade or a version update. A new character ID that is different from that of existing characters is given to these new characters.

For example, after the game has been updated, the player can possess (earn) a new character added via this game update by means of a lottery game, a quest, or second character fusion (evolution fusion).

Functional Units

Figure 4:
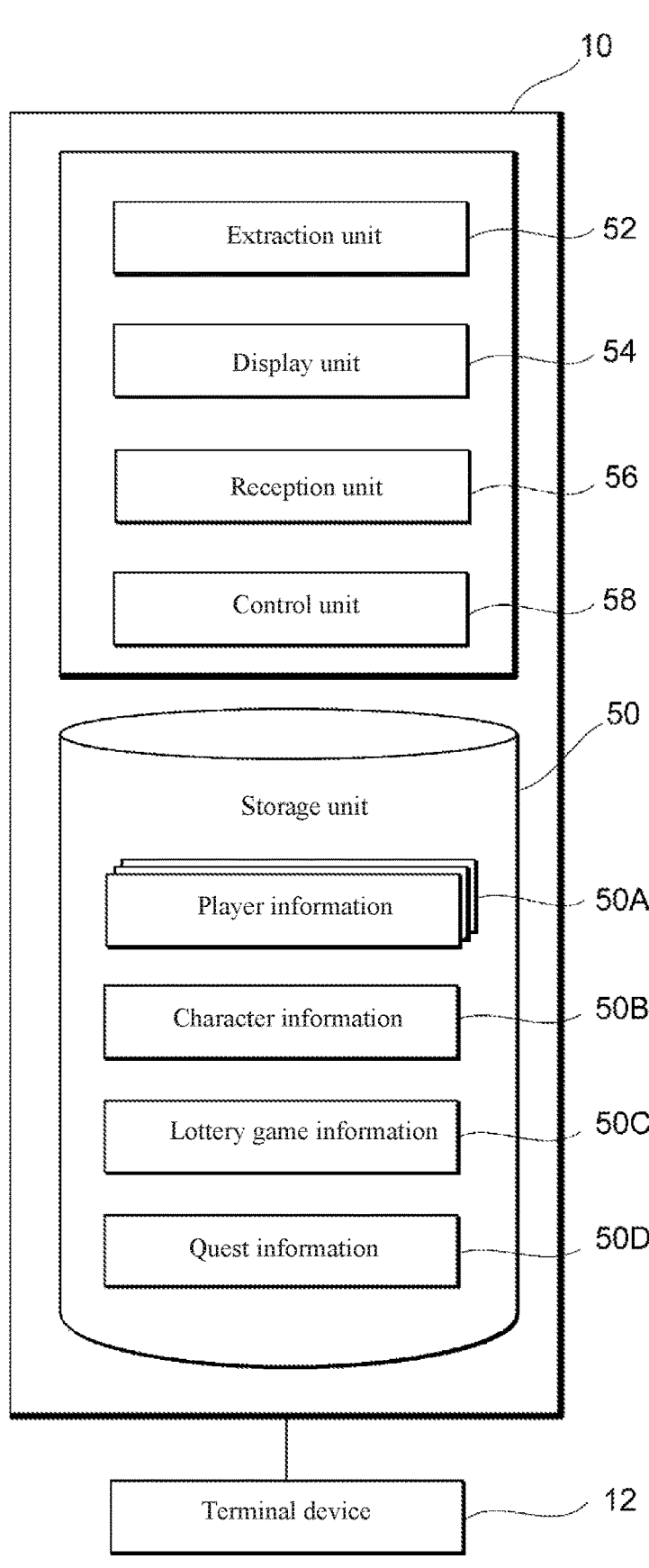
FIG. 4 is a block diagram schematically showing an example of the functional units of a server device.

FIG. 4 is a block diagram schematically showing an example of the functional units of the server device 10.

As shown in FIG. 4, the server device 10 comprises, as functional components, a storage unit 50, an extraction unit 52, a display unit 54, a reception unit 56, and a control unit

58. The storage unit 50 is realized in the form of one or more storage devices 28. Functional units other than the storage unit 50 are realized when the control device 20 executes the game program 14 stored in the storage device 28 or the like.

The storage unit 50 has the function of storing player information 50A, character information 50B, lottery game information 50C, quest information 50D, and the like.

Player information 50A is stored for each player in association with the player ID of that player. This player information 50A includes, for example, the player's name, age, player rank, possessed content information, stamina information, game play information, and so on.

Possessed content information includes possessed character information, possessed item information, possessed coin information, and so forth that are possessed by the player. Possessed character information includes the character ID of each character possessed by the player, and the ability parameters (level, specific parameter, hit points, attack power, defense power, etc.) of each character. Possessed item information includes the item ID and number of each item possessed by the player. These items include paid stones, paid tickets, free stones, free tickets, stamina recovery items, and the like. Possessed coin information includes the number of coins possessed by the player.

Stamina information includes the player's current stamina value and stamina upper limit value. The current stamina value is a value consumed when the player executes various quests. This current stamina value increases by a specific amount (such as 1) after a certain period of time (such as 3 minutes) elapses, and recovers to the stamina upper limit value. Also, this current stamina value is recovered beyond the stamina upper limit value when the player consumes paid stones, free stones, stamina recovery items, and so on. This stamina upper limit value increases along with the player rank. The player rank increases, for example, when the player gains player experience points by clearing quests.

Game play information includes the date/time when the player played various games. For example, the game play information includes the date/time when the player most recently executed a rearing game to strengthen or evolve a possessed character.

Character information 50B is stored for each character in association with the character ID of that character. Character information 50B includes, for example, the character name and image, ability parameter information, rarity, and evolution fusion information. This character information 50B is updated from time to time via a game update by the game operator.

Ability parameter information includes the initial values and maximum values for the various ability parameters of a character.

Rarity may be represented by a number from 1 to 6, for example. This number may be indicated by the number of stars, for example. Here, a character with a high rarity is set with an ability parameter or the like that is advantageous in a game (such as a quest).

Evolution fusion information includes the character ID of an evolved character, the cost required to evolve into that evolved character (the cost associated in advance with the character), and the add date/time, which is the date/time the evolved character is added. Cost includes the evolution resource character information or a number of coins. Evolution resource character information includes the evolution resource character ID and the value of the specific parameter required for an evolution resource. For example, the cost in order to evolve character D into character L, which is an evolved character, includes the character IDs of character T and character Y, which are evolution resource characters corresponding to character D, specific parameters corresponding to character T and character Y, and a number of coins. Note that a character may have a plurality of evolution destinations (evolved characters). In this case, the evolution fusion information includes the character ID and cost of each evolved character. The add date/time includes, for example, the date/time when an evolved character was added via a game update by the game operator, that is, the date/time when it became possible to evolve into that evolved character.

Lottery game information 50C is stored for each lottery game in association with the lottery game ID of the lottery game. Lottery game information 50C includes the lottery game name and price, lottery target information, and the like.

Price includes the number of items consumed in order to execute the lottery game one time. For example, the price for a certain lottery game may be five paid items.

Lottery target information includes the character IDs of the characters constituting the lottery target character group of a lottery game, and the appearance frequency (weighting) associated with that character ID. For example, 100 types of characters may constitute a lottery target character group. Their appearance frequency may be represented by a number from 1 to 10, for example. The appearance frequency is set to a low numerical value for a character with a high rarity, and to a high numerical value for a character with a low rarity. A character (pickup character) that appears more frequently than other characters within the same rarity may be provided. Here, the probability of drawing one character is a value obtained by dividing the appearance frequency set for that one character by the total value of the appearance frequencies set for the characters that constitute the lottery target. For example, if the appearance frequency set for one character is 2 and the total value of the appearance frequencies set for the characters that constitute the lottery target is 400, the probability of drawing that one character is 2/400 (0.5%).

Quest information 50D is stored for each quest in association with the quest ID of that quest. Quest information 50D includes the quest name, consumed stamina value, enemy character information, clearance reward information, and the like.

Consumed stamina value includes the value required to execute the quest. This consumed stamina value is deducted from the player's current stamina value, and the higher the difficulty of the quest, the higher the consumed stamina value is, for example.

Enemy character information includes character IDs and ability parameters of the enemy characters that appear in a quest.

Clearance reward information includes the number of unpaid items (such as free stones) and coins that can be earned when a quest is cleared, the character IDs and drop rates of enemy characters (evolution resource characters) that can be earned, player experience points, and so forth. The drop rate is the probability that the player will earn an enemy character (evolution resource character), and the higher the difficulty of a quest, the higher this probability is.

The extraction unit 52 is a functional unit for extracting content that satisfies specific conditions. In one or more embodiments, the extraction unit 52 extracts, from among the player's possessed characters (possessed contents), a character group (content group) to which an evolved character (evolved content), which is a new evolution destination, is added via a game update. In one or more embodiments, a character group includes two or more characters. For example, the extraction unit 52 extracts, from among the player's possessed characters, a character group to which a new evolved character was added via a game update that occurred between the date/time the player most recently executed the rearing game and the present time.

Also, the extraction unit 52 extracts the cost required to evolve each character included in the character group into an evolved character. For example, the extraction unit 52 extracts the cost (number of evolution resource characters and coins) required to evolve each character included in the character group to which a new evolved character has been added into the evolved character.

The display unit 54 is a functional unit for displaying various kinds of information on a touch panel 32. In one or more embodiments, the display unit 54 displays a notification screen for notifying the character group extracted by the extraction unit 52.

The display unit 54 displays a cost information area indicating the extracted cost on the screen where the reception unit 56 receives a selection instruction from the player. An example of the screen for receiving this selection instruction is a character selection screen that is displayed after the notification screen has been displayed. The cost information area indicates that the specific parameter of the evolution resource content is missing if the specific parameter of an evolution resource character possessed by the player is lower than the value required for evolution. Also, the cost information area includes a transition button for transitioning to a play screen of a game event in which an evolution resource character that has the missing specific parameter, or a character that is homologous to the evolution resource character, can be earned.

The reception unit 56 is a functional unit for receiving operation instructions from the player. In one or more embodiments, the reception unit 56 receives a batch instruction from the player to collectively evolve each of the plurality of characters included in the character group after the notification screen has been displayed by the display unit 54. An example of the screen for receiving this batch instruction is a character selection screen.

Also, the reception unit 56 receives a selection instruction from the player to select part or all of the characters in the character group after the notification screen has been displayed but before the batch instruction has been received. An example of the screen for receiving this selection instruction is a character selection screen that is displayed after the notification screen has been displayed.

The control unit 58 is a functional unit for controlling the entire game. In one or more embodiments, the control unit 58 collectively evolves and fuses each of the plurality of characters into an evolved character in response to the receipt by the reception unit 56 of a batch instruction from the player. For example, the control unit 58 collectively evolves and fuses the selected plurality of characters in response to the receipt by the reception unit 56 of a batch instruction after the receipt of a selection instruction to select part or all of the characters in the character group on the character selection screen.

Processing Flow

Figure 5:
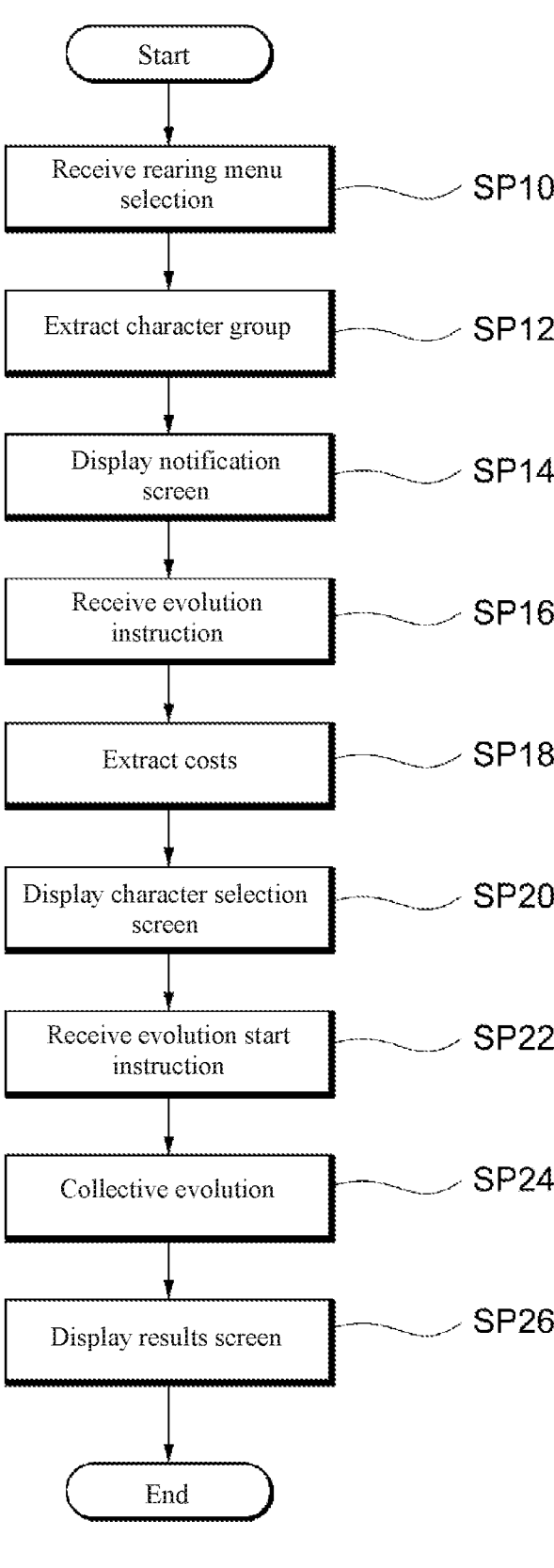
FIG. 5 is a flowchart showing an example of the flow of processing performed by each of the functional units shown in FIG. 4 in the game system according to one or more embodiments.

FIG. 5 is a flowchart showing an example of the flow of processing performed by each of the functional units shown in FIG. 4 in the game system according to one or more embodiments. Also, the processing of the following steps is commenced, for example, at the point when the player logs into a game. The order and details of the following steps can be changed as needed.

(Step SP10)

The reception unit 56 receives an instruction from the player to select the menu for the rearing game. The processing then moves to the processing of step SP12.

(Step SP12)

The extraction unit 52 refers to the possessed character and game play information in the player information 50A and the add date/time in the evolution fusion information of the character information 50B, and extracts, from among the player's possessed characters, a character group to which a new evolved character was added via a game update that occurred between the date/time the player most recently executed the rearing game and the present time. Then, the processing moves to the processing of step SP14.

(Step SP14)

The display unit 54 causes the touch panel 32 to display a notification screen for notifying the character group extracted in step SP10.

Figure 6:
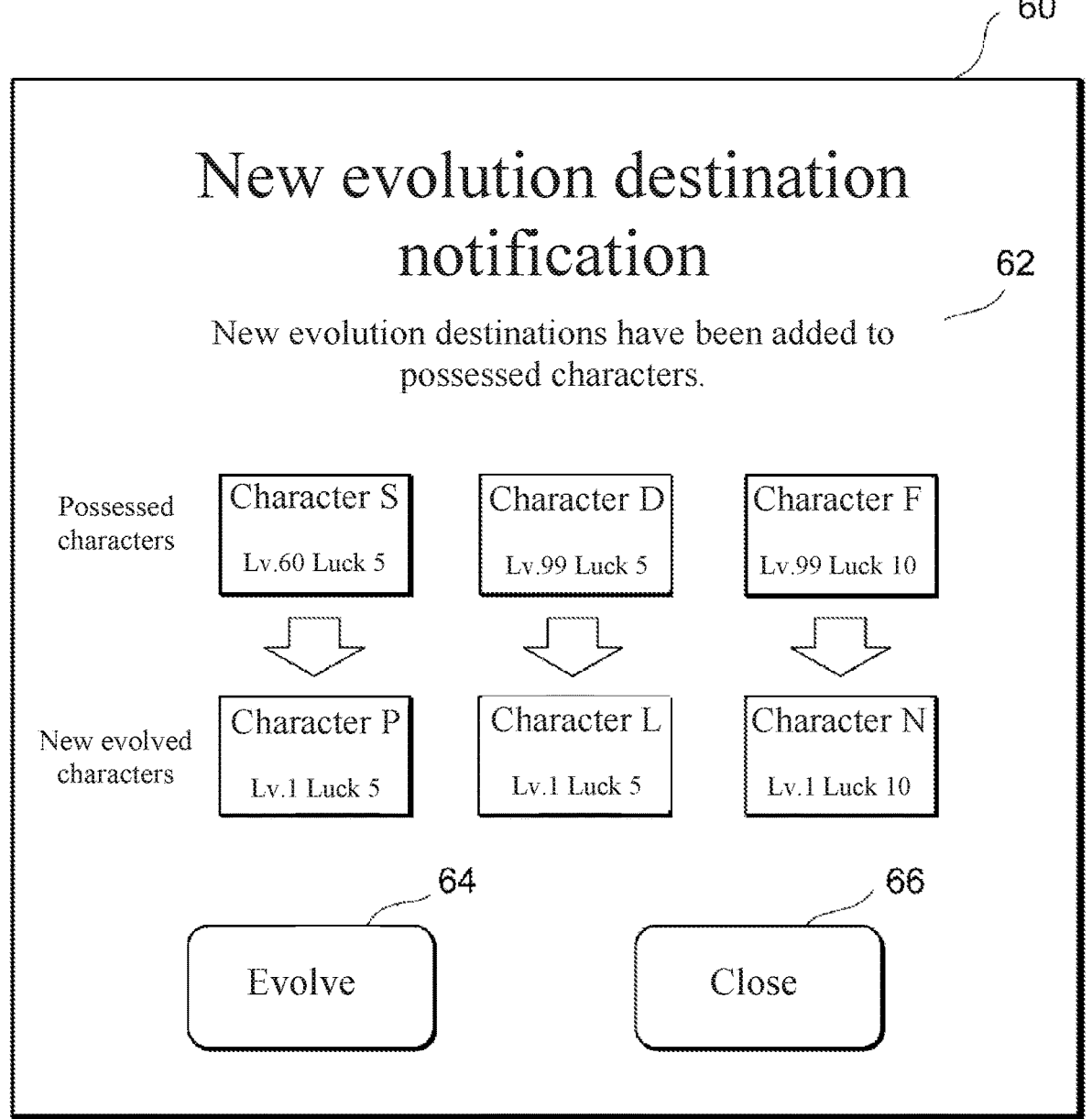
FIG. 6 is a diagram showing an example of a notification screen according to one or more embodiments.

FIG. 6 is a diagram showing an example of the notification screen 60 according to one or more embodiments.

As shown in FIG. 6, the notification screen 60 is provided with a notification information area 62, an evolution instruction button 64, and a close button 66. The notification information area 62 indicates the characters (possessed characters) included in the character group extracted in step SP12 and evolved characters, which are new evolution destinations.

The evolution instruction button 64 is an instruction button for evolving part or all of the character group.

The close button 66 is an instruction button for closing the notification screen 60 and executing a normal rearing game.

Going back to FIG. 5, the processing moves to step SP16.

(Step SP16)

The reception unit 56 receives the pressing of the evolution instruction button from the player. Then, the processing moves to the processing of step SP18.

(Step SP18)

The extraction unit 52 refers to the cost in the evolution fusion information of the character information 50B, and extracts the cost (evolution resource characters and coins) required to evolve each character that is included in the character group extracted in step SP10 into an evolved character. Then, the control unit 58 refers to the possessed content information of the player information 50A to confirm whether or not extracted evolution resource characters and the specific parameters of those evolution resource characters are missing. Then, if the evolution resource characters or the specific parameters of those evolution resource characters are missing, the control unit 58 refers to the lottery target information of the lottery game information 50C and to the clearance rewards of the quest information 50D to acquire a game event (lottery game or quest) in which the evolution resource characters or characters that are homologous to the evolution resource characters can be earned Then, the processing moves to the processing of step SP20.

(Step SP20)

The display unit 54 causes the touch panel 32 to display a character selection screen for selecting, as an evolution target, each character included in the character group extracted in step SP10.

Figure 7:
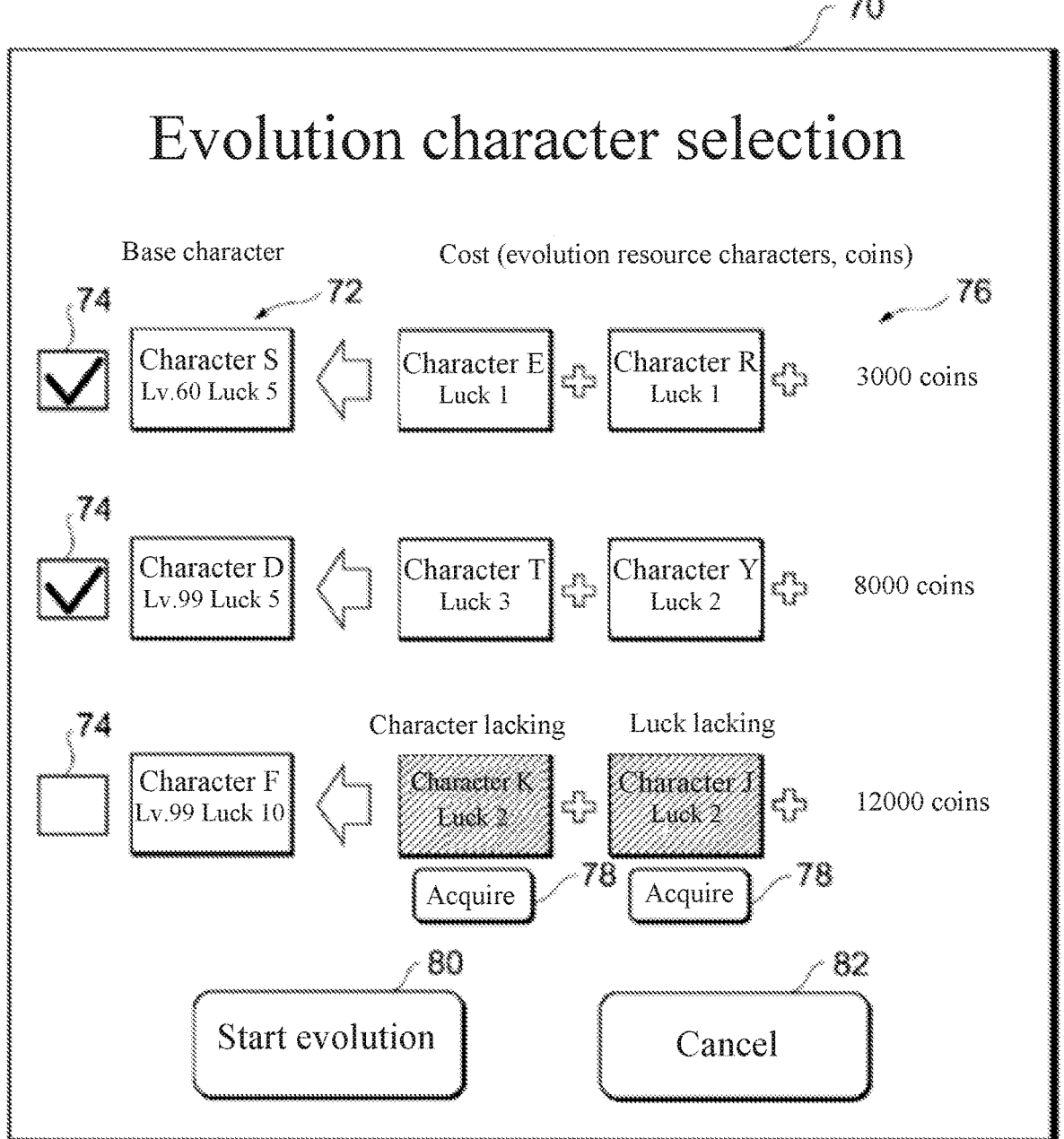
FIG. 7 is a diagram showing an example of a character selection screen according to one or more embodiments.

FIG. 7 is a diagram showing an example of the character selection screen 70 according to one or more embodiments.

As shown in FIG. 7, the character selection screen 70 is provided with a base character information area 72, a check box 74, a cost information area 76, an acquisition button 78, an evolution start button 80, and a cancel button 82. Each character (possessed character) included in the character group extracted in step SP12 is represented as a base character in the base character information area 72. A check box 74 is provided in association with each base character. For example, the reception unit 56 receives a selection instruction from the player to select part or all of the characters (base characters) in the character group with this check box 74. For example, when a check box 74 is pressed, the base character corresponding to this check box 74 is selected as an evolution target. The cost information area 76 shows the evolution resource characters and the number of coins, which are the costs extracted in step SP18, in association with each base character. Also, the cost information area 76 indicates that an evolution resource character is missing if the player does not possess that evolution resource character. Also, the cost information area 76 indicates that the specific parameter of the evolution resource character is missing if the specific parameter of an evolution resource character possessed by the player is lower than the value required for evolution. The acquisition button 78 is provided in the cost information area 76 in association with the missing evolutionary resource character, and is an instruction button for transitioning to a play screen of a game event in which that evolution resource character or a character that is homologous to that evolution resource character can be earned. For example, when this acquisition button is pressed, the screen may transition to a screen for executing a quest or a lottery game. The evolution start button 80 is an instruction button (batch instruction button) for collectively evolving the base characters selected as evolution targets. The cancel button 82 is an instruction button for closing the character selection screen 70 and executing a normal rearing game.

Going back to FIG. 5, the processing moves to step SP22.

(Step SP22)

The reception unit 56 receives the pressing of the evolution start button (batch instruction button) from the player. Then, the processing moves to the processing of step SP24.

(Step SP24)

The control unit 58 collectively evolves and fuses a plurality of characters (base characters) for which a selection instruction has been received by the reception unit 56 on the character selection screen. More specifically, the control unit 58 consumes the cost (content) corresponding to each character for which a selection instruction has been received from the possessed content information of the player information 50A, collectively evolves each of these characters into an evolved character, and updates the possessed character information in the player information 50A. Then, the processing moves to the processing of step SP26.

(Step SP26)

The display unit 54 causes the touch panel 32 to display a results screen, which are the results of the evolution fusion in step SP24.

Figure 8:
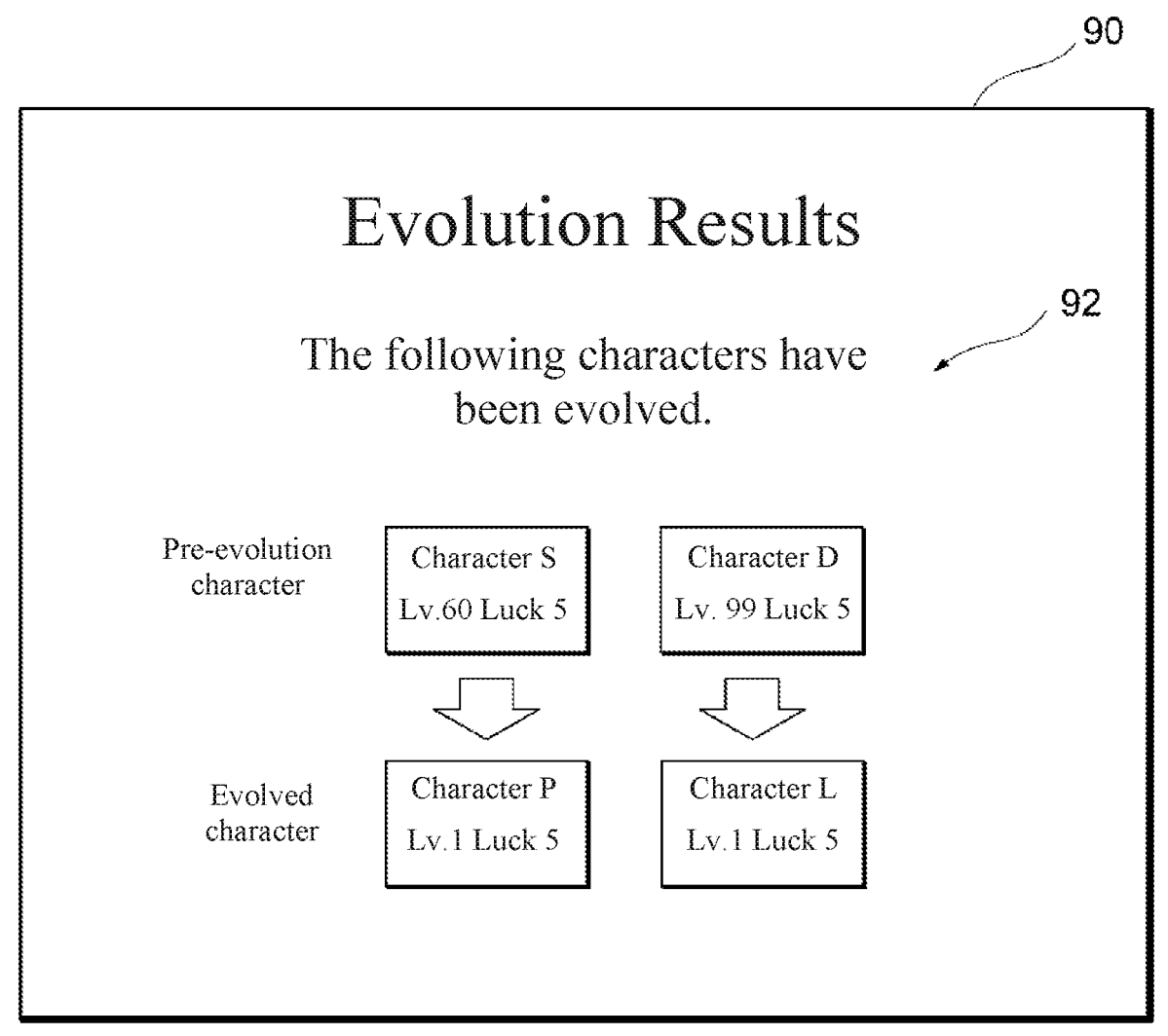
FIG. 8 is a diagram showing an example of a results screen according to one or more embodiments.

FIG. 8 is a diagram showing an example of a results screen 90 according to one or more embodiments.

As shown in FIG. 8, the results screen 90 is provided with an evolution result information area 92. Characters that have yet to undergo evolution fusion and evolved characters that have undergone evolution fusion are displayed in the evolution result information area 92.

Then, the processing ends the processing series shown in FIG. 5.

Effect

As described above, in one or more embodiments, a computer is made to function as an extraction unit 52 for extracting, from among the player's possessed contents, a content group to which an evolved content, which is a new evolution destination, has been added via a game update; a display unit 54 for displaying a notification screen notifying the extracted content group; a reception unit 56 for receiving a batch instruction from the player to collectively evolve each of the plurality of contents included in the content group after the notification screen has been displayed; and a control unit 58 for collectively evolving and fusing each of the plurality of contents into the evolved content in response to receiving the batch instruction.

With this configuration, from among the player's possessed contents, each of the plurality of contents included in the content group to which the new evolution destination has been added via a game update can be collectively evolved into the evolved content with a batch instruction. Therefore, the player can evolve a plurality of contents to which a new evolution destination has been added via a game update with a simple operation.

Also, in one or more embodiments, the reception unit 56 receives a selection instruction from the player to select part or all of the contents included in the content group after the notification screen has been displayed but before a batch instruction has been received, and the control unit 58 collectively evolves and fuses the selected plurality of contents in response to receiving the batch instruction.

With this configuration, any content that the player does not want to evolve into the evolved content, from among the content groups to which new evolution destinations have been added via a game update, can be excluded from selection.

This makes it possible to provide a game that is very convenient for the player.

Also, in one or more embodiments, the extraction unit 52 extracts the costs required to evolve each of the contents included in the content group into the evolved content, and the display unit 54 displays a cost information area showing the extracted costs on the screen for receiving the selection instruction.

With this configuration, the player can select which content to evolve while confirming the cost required for the evolution of each of the contents included in the content group, thereby allowing information that is very useful to be provided to the player.

Also, in one or more embodiments, the cost includes an evolution resource content.

With this configuration, the player can select which content to evolve while confirming the evolution resource content necessary for the evolution of each of the contents included in the content group, thereby allowing information that is very useful to be provided to the player.

Also, in one or more embodiments, the evolution resource content has a specific parameter that rises in a case that a homologous content is fused, and the cost information area indicates that the specific parameter of the evolution resource content is missing if the specific parameter of the evolution resource content possessed by the player is lower than the value required for the evolution.

With this configuration, since the player is shown about the evolution resource content that is missing a specific parameter, the player is motivated to earn the evolution resource content, and the game can be energized.

Also, in one or more embodiments, the cost information area includes an instruction button for transitioning to a play screen of a game event in which the evolution resource content that is missing the specific parameter, or content that is homologous to the evolution resource content, can be earned.

With this configuration, since the player can be guided to a game event in which the evolution resource content or the homologous content can be earned, the player is motivated to increase a specific parameter, and the game can be energized.

MODIFICATION EXAMPLES

The present invention is not limited to or by the above specific example. That is, suitable design changes made to the above specific example by a person skilled in the art are also encompassed by the scope of the present invention as long as they still have the features of the present invention. Also, the elements of the embodiments described above and the modified examples (discussed below) can be combined to the extent that this is technically possible, and these combinations are also encompassed by the scope of the present invention as long as they still have the features of the present invention.

For example, in the above embodiments, a case was described in which the reception unit 56 received a selection instruction from the player to select part or all of the characters (base characters) in the character group on the character selection screen, but a selection instruction to select those characters may instead be received on the notification screen. In this case, the notification screen may be provided with, for example, a check box, a cost information area, and an evolution start button (batch instruction button).

Also, the display unit 54 may display the notification screen or the character selection screen in a state in which a check box corresponding to a character (base character) whose cost is not missing has been checked from the outset (a state of being selected as an evolution target).

Also, in the above embodiments, a case was described in which the display unit 54 displayed that the evolution resource characters were missing in the cost information area of the character selection screen, but may instead display that coins are missing. In this case, an instruction button (acquisition button) for transitioning to a play screen of a game event in which coins can be earned may be displayed in the cost information area.

Also, in the above embodiments, a case was described in which the acquisition button was provided in association with missing evolution resource characters on the character selection screen, but this acquisition button may be provided in association with evolution resource characters that are not missing.

Also, in the above embodiments, a case was described in which the cost information area was provided on the character selection screen, but a confirmation button for confirming the cost may be provided in association with the base characters. For example, when this confirmation button is pressed, evolution resource characters and coins, which are the costs, may be displayed in pop-up fashion.

Also, in the above embodiments, a case was described in which the cost information area included evolution resource characters and the number of coins, but may instead include resource characters that are required to change the level of a base character through strengthening fusion. These resource characters include, for example, characters that are required to raise the level of a base character to the maximum value (such as 99), and characters that are required to raise the level of an evolved character to the maximum value.

Also, in the above embodiments, a case was described in which the display unit 54 displayed the notification screen in response to the receipt by the reception unit 56 of an instruction from the player to select the menu for the rearing game, but the notification screen may be displayed at the point when the player logs in to the game, or at the point when a notification email from the game operator is opened.

Also, in the above embodiments, characters were mainly used as an example of content, but various items (weapons, armor, jewels, etc.), cards, avatars, coins, points, etc., may also be used.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10 . . . servicer device, 12 . . . terminal device, 50 . . . storage unit, 52 . . . extraction unit, 54 . . . display unit, 56 . . . reception unit, 58 . . . control unit

What is claimed is:

1. A non-transitory computer readable recording medium storing instructions that cause a computer to function as:

a control device that:

extracts, from among player's possessed contents, a content group to which an evolved content as a new evolution destination has been added via a game update, causes a display device to display a notification screen that notifies the extracted content group, extracts a cost required to evolve each of the contents included in the content group into the evolved content, causes the display device to display a character selection screen indicating:

the extracted content group, and whether an evolution resource content possessed by a player is enough to pay the extracted cost, and provided that the evolution resource content possessed by the player is enough to pay the extracted cost, upon receiving from the player via the character selection screen a batch instruction to collectively evolve each of contents included in the content group, collectively evolves and fuses the contents into the evolved content.

2. The non-transitory computer readable recording medium according to claim 1, wherein the control device further:

receives, via the character selection screen, a selection instruction to select part or all of the contents included in the content group before the batch instruction has been received, and upon receiving the batch instruction, collectively evolves and fuses the selected contents.

3. The non-transitory computer readable recording medium according to claim 1 wherein the evolution resource content possessed by the player has a specific parameter that rises in a case that a homologous content is fused, and in a case that the specific parameter is lower than a value required for evolution, the character selection screen indicates that the specific parameter is missing.

4. The non-transitory computer readable recording medium according to claim 3, wherein the character selection screen includes an instruction button for transitioning to a play screen of a game event in which the evolution resource content that has the missing specific parameter, or the homologous content of the evolution resource content, can be earned.

5. An information processing device, comprising:

a control device that:

extracts, from among player's possessed contents, a content group to which an evolved content as a new evolution destination has been added via a game update, causes a display device to display a notification screen that notifies the extracted content group, extracts a cost required to evolve each of the contents included in the content group into the evolved content, causes the display device to display a character selection screen indicating:

the extracted content group, and whether an evolution resource content possessed by a player is enough to pay the extracted cost, and provided that the evolution resource content possessed by the player is enough to pay the extracted cost, upon receiving from the player via the character selection screen a batch instruction to collectively evolve each of contents included in the content group, collectively evolves and fuses the contents into the evolved content.

6. The non-transitory computer readable recording medium according to claim 1, wherein the control device further:

upon receiving the batch instruction, collectively evolves and fuses the contents into the evolved content by consuming, as the extracted cost, the evolution resource content required to evolve each of the contents included in the content group into the evolved content, and a resource content required to raise a level of the evolved content to a maximum value.

\* \* \* \* \*